(12) United States Patent
Iftime et al.

(10) Patent No.: US 7,674,326 B2
(45) Date of Patent: *Mar. 9, 2010

(54) FLUORESCENT PHASE CHANGE INKS

(75) Inventors: Gabriel Iftime, Mississauga (CA); Christopher A. Wagner, Etobicoke (CA); C. Geoffrey Allen, Waterdown (CA); Peter M. Kazmaier, Mississauga (CA); Peter G. Odell, Mississauga (CA); Paul F. Smith, Oakville (CA)

(73) Assignee: Xerox Corporation, Norwalk, CT (US)

( * ) Notice: Subject to any disclaimer, the term of this patent is extended or adjusted under 35 U.S.C. 154(b) by 724 days.

This patent is subject to a terminal disclaimer.

(21) Appl. No.: 11/548,775

(22) Filed: Oct. 12, 2006

(65) Prior Publication Data

US 2008/0087190 A1  Apr. 17, 2008

(51) Int. Cl.
C09D 11/02 (2006.01)
G01D 11/00 (2006.01)

(52) U.S. Cl. ............. 106/31.29; 106/31.32; 106/31.61; 106/31.64; 106/31.58; 106/31.86; 347/100

(58) Field of Classification Search ............ 106/31.29, 106/31.32, 31.61, 31.64, 31.58, 31.86; 347/100
See application file for complete search history.

(56) References Cited

U.S. PATENT DOCUMENTS

| 4,251,824 | A |   | 2/1981  | Hara et al. |
| 4,410,899 | A |   | 10/1983 | Haruta et al. |
| 4,412,224 | A |   | 10/1983 | Sugitani |
| 4,490,731 | A |   | 12/1984 | Vaught |
| 4,532,530 | A |   | 7/1985  | Hawkins |
| 4,601,777 | A |   | 7/1986  | Hawkins et al. |
| 5,006,170 | A |   | 4/1991  | Schwarz et al. |
| 5,122,187 | A |   | 6/1992  | Schwarz et al. |
| 5,507,864 | A | * | 4/1996  | Jaeger et al. ............. 106/31.32 |
| 6,166,104 | A | * | 12/2000 | Kobayashi .................. 523/160 |
| 6,547,380 | B2 |  | 4/2003  | Smith et al. |
| 6,586,492 | B1 | * | 7/2003  | Caiger et al. .................. 522/75 |
| 6,858,070 | B1 | * | 2/2005  | Wong et al. ............. 106/31.61 |
| 6,906,118 | B2 |  | 6/2005  | Goodbrand et al. |
| 7,538,145 | B2 | * | 5/2009  | Belelie et al. ................. 522/79 |
| 2003/0172841 | A1 |  | 9/2003 | Titterington et al. |
| 2004/0261657 | A1 |  | 12/2004 | Wu et al. |
| 2005/0005819 | A1 | * | 1/2005 | Huinck ..................... 106/31.29 |
| 2005/0011410 | A1 |  | 1/2005 | Banning et al. |
| 2005/0011411 | A1 |  | 1/2005 | Banning et al. |
| 2005/0016417 | A1 |  | 1/2005 | Wu et al. |
| 2006/0016369 | A1 |  | 1/2006 | Wu et al. |
| 2006/0020141 | A1 |  | 1/2006 | Banning et al. |
| 2006/0021546 | A1 |  | 2/2006 | Wu et al. |
| 2008/0090928 | A1 | * | 4/2008 | Iftime et al. .................. 522/75 |

* cited by examiner

*Primary Examiner*—Jerry Lorengo
*Assistant Examiner*—Veronica Faison Gee
(74) *Attorney, Agent, or Firm*—Oliff & Berridge, PLC

(57) ABSTRACT

Disclosed is a phase change ink containing a fluorescent colorant that upon exposure to activating energy fluoresces such that an image that was not visible prior to exposure to the activating energy becomes visible. Also disclosed are an ink jet system and a process for authenticating a color document using the disclosed phase change ink.

22 Claims, No Drawings

FLUORESCENT PHASE CHANGE INKS

BACKGROUND

Described herein are inks such as solid phase change or hot melt inks that may be used in a number of copying and printing devices, inclusive of printing transient information on an image receiving substrate.

In embodiments, an advantage associated with the fluorescent phase change inks disclosed herein is that the ink may be used in place of or with a non-fluorescent ink, thereby permitting the formation of images using a known ink jet printing device. In embodiments, an additional advantage associated with the use of the fluorescent inks disclosed herein is that the fluorescent ink may be overprinted other non-fluorescent inks used in an ink set, thereby substantially eliminating differential gloss.

REFERENCES

Ink jetting devices are well known in the art. As described in U.S. Pat. No. 6,547,380, the disclosure of which is incorporated herein by reference in its entirety, ink jet printing systems are generally of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium. There are generally three types of drop-on-demand ink jet systems. One type of drop-on-demand system is a piezoelectric device that has as its major components an ink filled channel or passageway having a nozzle on one end and a piezoelectric transducer near the other end to produce pressure pulses. Another type of drop-on-demand system is known as acoustic ink printing. As is known, an acoustic beam exerts a radiation pressure against objects upon which it impinges. Thus, when an acoustic beam impinges on a free surface (that is, liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal ink jet, or bubble jet, and produces high velocity droplets. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands.

In a typical design of a piezoelectric ink jet device, the image is applied by jetting appropriately colored inks during four to eighteen rotations (incremental movements) of a substrate such as an image receiving member or intermediate transfer member with respect to the ink jetting head, that is, there is a small translation of the printhead with respect to the substrate in between each rotation. This approach simplifies the printhead design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Thermal ink jet processes are well known and are described, for example, in U.S. Pat. Nos. 4,601,777, 4,251,824, 4,410,899, 4,412,224 and 4,532,530, the disclosures of each of which are totally incorporated herein by reference.

Ink jet printing processes may employ inks that are solid at room temperature and liquid at elevated temperatures. Such inks may be referred to as hot melt inks or phase change inks. For example, U.S. Pat. No. 4,490,731, the disclosure of which is totally incorporated herein by reference, discloses an apparatus for dispensing solid ink for printing on a substrate such as paper. In thermal ink jet printing processes employing hot melt inks, the solid ink is melted by the heater in the printing apparatus and utilized (that is, jetted) as a liquid in a manner similar to that of conventional thermal ink jet printing. Upon contact with the printing substrate, the molten ink solidifies rapidly, enabling the colorant to substantially remain on the surface of the substrate instead of being carried into the substrate (for example, paper) by capillary action, thereby enabling higher print density than is generally obtained with liquid inks. Advantages of a phase change ink in ink jet printing are thus elimination of potential spillage of the ink during handling, a wide range of print density and quality, minimal paper cockle or distortion, and enablement of indefinite periods of nonprinting without the danger of nozzle clogging, even without capping the nozzles.

U.S. Pat. Nos. 5,006,170 and 5,122,187, the disclosures of each of which are incorporated herein by reference in their entireties, disclose hot melt ink compositions suitable for ink jet printing that comprise a colorant, a binder, and a propellant.

SUMMARY

Disclosed herein is an ink set comprised of at least one fluorescent phase change ink comprising at least one fluorescent material, wherein upon exposure to activating energy, the fluorescent material fluoresces to cause a visible change in the appearance of the ink.

In further embodiments, disclosed herein is an ink jet system, comprising an ink set comprised of at least one fluorescent phase change ink comprising at least one fluorescent material, wherein upon exposure to activating energy, the fluorescent material fluoresces to cause a visible change in the appearance of the ink, and an ink jet device including an ink jet head consisting of at least one channel for each of the phase change inks in the ink set, and a supply path that supplies each of the phase change inks to the respective channels of the ink jet head from reservoirs containing each of the phase change inks.

In yet further embodiments, disclosed herein is a process of making an image having fluorescent ability, comprising jetting an ink from an ink set onto a recording media to form an image, and curing the image by exposing the image to radiation, wherein the an ink set is comprised of at least one fluorescent phase change ink comprising at least one fluorescent material, wherein upon exposure to activating energy, the fluorescent material fluoresces to cause a visible change in the appearance of the ink.

EMBODIMENTS

Described herein are phase change inks of ink sets that may fluoresce upon exposure to radiation. The fluorescent property of the phase change ink sets disclosed herein may be especially useful in security applications. In embodiments, the fluorescent material is not noticeable to a viewer when viewed in ambient light, but becomes noticeable when exposed to radiation at which the fluorescent material fluoresces, as will be described below. Upon the printed image/document being removed from exposure to the activating radiation, the fluorescent material once again returns to a non-fluorescent state. Such a feature may be useful, for example, in authentication of documents, as a forged document or photocopy would not have the ability to fluoresce and change appearance upon exposure to the activating radiation. The change between the fluorescing state and the non-fluorescing state can be repeated an indefinite number of times, and for example from about 10 to about 100,000,000 times or more.

A fluorescent ink, that is an ink containing at least a fluorescent material, may be included in ink sets in several different ways. First, the fluorescent material may be included in one or more colored phase change inks of the ink set. Second, the fluorescent material may be included in a phase change ink that does not include any non-fluorescent colorant so as to be a substantially colorless ink. Third, fluorescent material may be included in a phase change ink such that the fluorescent material is colored when viewed in ambient light, and fluoresces a different color or the same color when exposed to activating radiation.

When the fluorescent material is included in one or more of the colored phase change inks of an ink set, the fluorescent material noticeably alters the appearance of the printed ink upon exposure to radiation. In ambient light, the printed ink will exhibit the intended color of the non-fluorescent colorant in the colorant ink. However, upon exposure to radiation, fluorescence of the fluorescent material in the ink visibly changes the color exhibited by the ink. For example, a yellow fluorescent ink exhibits the intended yellow color in ambient light, but upon exposure to activating radiation, the fluorescence of the fluorescent material changes the color exhibited to a different color, for example to a red color.

When the fluorescent material is included in a phase change ink that does not include a colorant therein, the printed ink is not visible or apparent to a viewer in ambient light. Upon exposure to radiation, the fluorescence of the fluorescent material causes the ink to become visible.

Advantages of including a fluorescent material in an ink of an ink set include making images, texts, etc., that appear normal in ambient light, but which are noticeably altered in appearance upon exposure to radiation. When the images, text, etc., printed with an ink having the fluorescent material are photocopied, the image, text, etc., will not be visible in the photocopy. This is because the fluorescent material does not fluoresce under existing copying conditions, and thus will not appear in a copy. Moreover, the copier will not contain any ink with fluorescent material, so that the copy will not fluoresce at all. Such a feature is advantageous in that authentication is possible because falsified copies cannot be made to include the fluorescent property.

Also, this feature can permit one to intentionally embed hidden information in documents, which information is only revealed to one knowing to expose the document to activating energy.

Examples of phase change inks for use herein, including colored inks with or without the fluorescent material and fluorescent only (non-colored) inks, are inks that include an ink vehicle that is solid at temperatures of about 23° C. to about 27° C., for example room temperature, and specifically are solid at temperatures below about 40° C. However, the inks change phase upon heating, and are in a molten state at jetting temperatures. Thus, the inks have a viscosity of from about 1 to about 20 centipoise (cp), for example from about 5 to about 15 cp or from about 8 to about 12 cp, at an elevated temperature suitable for ink jet printing, for example temperatures of from about 60° C. to about 150° C.

In this regard, all of the inks suitable for use herein may be either low energy inks or high energy inks. Low energy inks are solid at a temperature below about 40° C. and have a viscosity of from about 5 to about 15 centipoise at a jetting temperature of from about 80° C. to about 150° C., for example from about 90° C. to about 130° C. or from about 110° C. to about 120° C. High energy inks are solid at a temperature below 40° C. and have a viscosity of from about 5 to about 15 centipoise at a jetting temperature of from about 100° C. to about 180° C., for example from about 120° C. to about 160° C. or from about 125° C. to about 150° C.

The ink vehicles for the phase change inks may have melting points of from about 60° C. to about 150° C., for example from about 80° C. to about 120° C. or from about 85° C. to about 110° C., as determined by, for example, observation and measurement on a microscope hot stage, wherein the binder material is heated on a glass slide and observed by microscope. Higher melting points are also acceptable, although printhead life may be reduced at temperatures higher than 150° C.

In addition, the surface tension of the vehicle at the operating (jetting) temperature of the ink should be from about 20 to about 65 dynes per centimeter, for example from about 40 to about 65 dynes per centimeter, to enhance refill rates, paper wetting, and color mixing.

Fluorescent, or fluorescent ink, refers to, for example, the capability of a material or the ink to fluoresce upon exposure to an activating radiation, for example a radiation source having a wavelength from about 100 nm to about 1100 nm, such as from about 150 nm to about 900 nm or from about 200 nm to about 600 nm. The activating radiation may thus be in the ultraviolet (UV), visible or infrared regions, although the use of activating radiation in the UV region (from about 100 nm to about 400 nm) is most common. The fluorescing may occur instantaneously on exposure to the activating radiation, or may occur after overcoming any activation phase. The fluorescing exhibited by the fluorescent ink is reversible, but should last for a time period permitting the color change or image appearance to be detected, for example a time frame of from about 0.5 seconds to about 1 hour, such as from about 1 second to about 45 minutes or from about 5 seconds to about 30 minutes.

In embodiments, the ink set herein comprises at least one phase change ink having therein a fluorescent material. The fluorescent material of the at least one phase change ink fluoresces upon exposure to activating energy.

In further embodiments, the ink set disclosed herein includes at least one substantially clear (transparent) or non-colorant containing ink having a fluorescent material that is substantially clear to the naked eye, but that fluoresces upon exposure to an activating radiation source. Such an ink set may further include at least one non-fluorescent phase change ink, which does not include any fluorescent material but desirably includes at least one colorant, and/or may also include additional colored fluorescent phase change inks.

The fluorescent ink(s) may be applied to a substrate after images using non-fluorescent ink have been formed, prior to images from the non-fluorescent inks being formed, and/or applied at the same time as any non-fluorescent inks. The non-fluorescent ink images may be overprinted with a substantially clear fluorescent phase change ink. The substantially clear fluorescent phase change ink disclosed herein may be applied over images printed using non-fluorescent ink and has an advantage in that the color of the base print is unimportant because in ambient light the base print may be easily viewed through the clear fluorescent ink. The substantially clear fluorescent phase change ink does not adversely affect the appearance of the visible image formed by the non-fluorescent inks of the ink set where the gloss of the images formed from the non-fluorescent ink and the gloss of the images formed from the fluorescent ink are similar. Of course, the substantially clear fluorescent ink, or colored fluorescent ink, may be applied alone in an ink set comprised of a single ink.

Each of the phase change inks of the ink set, including any fluorescent phase change ink, may be made to exhibit substantially the same gloss upon printing. As such, an advantage herein is that the differential gloss realized when overcoating a formed image with a conventional clear overcoat or ink may be avoided. Gloss is a measure of an image's shininess, which should be measured after the image has been formed on a print sheet. Gloss may be measured using a Gardiner Gloss metering unit. In embodiments herein, each of the inks used in the ink set, including the fluorescent phase change ink(s) of the ink set, are made to have substantially matched gloss. In this regard, each of the inks should have a gloss within about 5 Gardiner gloss units (ggu) of each other, for example a gloss value within from 0 to about 5 ggus or from about 0.5 to about 3 ggus or from about 0.5 to about 2 ggus, of each other. In doing so, the formed image having fluorescent capabilities exhibits substantially no differential gloss, and thus the appearance of the image is uniform.

In embodiments, only one of the inks of the ink set includes a fluorescent material. For example, the fluorescent material in an ink set of cyan, magenta, yellow, optionally with black, is included in one of these colored inks. The fluorescent material of the ink set may be in an ink having a color that does not mask fluorescing upon exposure to activating radiation. For example, fluorescence, manifested as a color change or an appearance change of the color image may be more readily apparent when the fluorescent material is included in a lighter shade colored ink such as yellow or magenta. Fluorescence might not be noticeable in a very dark ink such as black. Of course, more than one ink of the ink set may include a fluorescent material, and in fact all may include fluorescent material such that each ink would fluoresce in a different color. Such an embodiment has an advantage in that differential gloss is further decreased because no colorless ink is over the printed image. The ink set may also include one or more colored fluorescent inks as well as a fluorescent non-colored ink.

In yet further embodiments the fluorescent material may be exhibit a color even when viewed in ambient light. When exposed to the activation energy, that is, radiative energy, the fluorescent material fluoresces a color which may be the same or different from the color displayed in ambient light. A change in the appearance of the ink is visible due to fluorescence of the fluorescent material upon exposure to activating energy.

The colored fluorescent material may be included in a colored phase change ink. In such embodiments, the resulting color in ambient light is a combination of the colors of the fluorescent material and the colored non-fluorescent material. When exposed to activating energy, the color is substantially changed due to the fluorescence emission of the fluorescent material.

Color refers to, for example, the overall absorption characteristic within the same range of wavelengths of the electromagnetic spectrum. Thus, differently colored inks exhibit a color, that is, an absorption characteristic, different from each other. For example, if a first ink exhibits a yellow color, then a second differently colored ink will exhibit a different shade of yellow or a different color altogether, for example such as cyan or magenta. In an embodiment of a three color ink herein, the three inks of the ink set may comprise the three subtractive primary colors yellow, cyan and magenta, or may comprise red, blue and green. An example four color ink set may comprise yellow, cyan, magenta and black. Additional differently colored inks, for example for highlight coloring inks, may be included in these ink sets.

Any suitable ink vehicle can be employed in any of the phase change inks disclosed herein. Suitable vehicles can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers such as further discussed below.

Examples of suitable ink vehicles include, for example, ethylene/propylene copolymers, such as those available from Petrolite and of the general formula

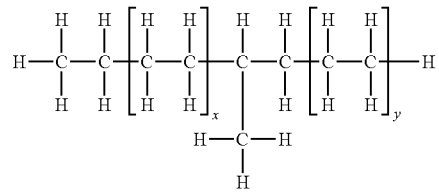

wherein y represents an integer from 0 to about 30, for example from 0 to about 20 or from 0 to about 10 and x is equal to about 21-y. The copolymers may have, for example, a melting point of from about 70° C. to about 150° C., such as from about 80° C. to about 130° C. or from about 90° C. to about 120° C. and a molecular weight range of from about 500 to about 4,000. Commercial examples of such copolymers include, for example, Petrolite CP-7 (Mn=650), Petrolite CP-11 (Mn=1,100, Petrolite CP-12 (Mn=1,200) and the like.

Urethane derivatives of oxidized synthetic or petroleum waxes, such as those available from Petrolite and of the general formulas

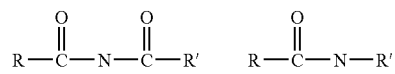

-continued

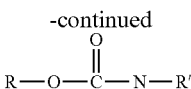

wherein R is an alkyl group of the formula $CH_3(CH_2)_n$, n is an integer of from about 5 to about 400, for example from about 10 to about 300 or from about 20 to about 200 and R' is a tolyl group, may also be used as the ink vehicle. These materials may have a melting point of from about 60° C. to about 120° C., such as from about 70° C. to about 100° C. or from about 70° C. to about 90° C. Commercial examples of such materials include, for example, Petrolite CA-11 (Mn=790, Mw/Mn=2.2), Petrolite WB-5 (Mn=650, Mw/Mn=1.7), Petrolite WB-17 (Mn=730, Mw/Mn=1.8), and the like.

Another type of ink vehicle may be n-paraffinic, branched paraffinic, and/or naphthenic hydrocarbons, typically with from about 5 to about 100, such as from about 20 to about 180 or from about 30 to about 60 carbon atoms, generally prepared by the refinement of naturally occurring hydrocarbons, such as BE SQUARE 185 and BE SQUARE 195, with molecular weights (Mn) of from about 100 to about 5,000, such as from about 250 to about 1,000 or from about 500 to about 800, for example such as available from Petrolite.

Highly branched hydrocarbons, typically prepared by olefin polymerization, such as the VYBAR materials available from Petrolite, including VYBAR 253 (Mn=520), VYBAR 5013 (Mn=420), and the like, may also be used. In addition, the ink vehicle may be an ethoxylated alcohol, such as available from Petrolite and of the general formula

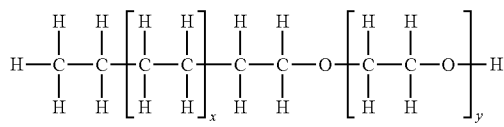

wherein x is an integer of from about 1 to about 50, such as from about 5 to about 40 or from about 11 to about 24 and y is an integer of from about 1 to about 70, such as from about 1 to about 50 or from about 1 to about 40. The materials may have a melting point of from about 60° C. to about 150° C., such as from about 70° C. to about 120° C. or from about 80° C. to about 110° C. and a molecular weight (Mn) range of from about 100 to about 5,000, such as from about 500 to about 3,000 or from about 500 to about 2,500. Commercial examples include UNITHOX 420 (Mn=560), UNITHOX 450 (Mn=900), UNITHOX 480 (Mn=2,250), UNITHOX 520 (Mn=700), UNITHOX 550 (Mn=1,100), UNITHOX 720 (Mn=875), UNITHOX 750 (Mn=1,400), and the like.

As an additional example, the ink vehicle may be made of fatty amides, such as monoamides, tetra-amides, mixtures thereof, and the like, for example such as described in U.S. Pat. No. 6,858,070, incorporated herein by reference. Suitable monoamides may have a melting point of at least about 50° C., for example from about 50° C. to about 150° C., although the melting point can be below this temperature. Specific examples of suitable monoamides include, for example, primary monoamides and secondary monoamides. Stearamide, such as KEMAMIDE S available from Witco Chemical Company and CRODAMIDE S available from Croda, behenamide/arachidamide, such as KEMAMIDE B available from Witco and CRODAMIDE BR available from Croda, oleamide, such as KEMAMIDE U available from Witco and CRODAMIDE OR available from Croda, technical grade oleamide, such as KEMAMIDE O available from Witco, CRODAMIDE O available from Croda, and UNISLIP 1753 available from Uniqema, and erucamide such as KEMAMIDE E available from Witco and CRODAMIDE ER available from Croda, are some examples of suitable primary amides. Behenyl behenamide, such as KEMAMIDE EX666 available from Witco, stearyl stearamide, such as KEMAMIDE S-180 and KEMAMIDE EX-672 available from Witco, stearyl erucamide, such as KEMAMIDE E-180 available from Witco and CRODAMIDE 212 available from Croda, erucyl erucamide, such as KEMAMIDE E-221 available from Witco, oleyl palmitamide, such as KEMAMIDE P-181 available from Witco and CRODAMIDE 203 available from Croda, and erucyl stearamide, such as KEMAMIDE S-221 available from Witco, are some examples of suitable secondary amides. Additional suitable amide materials include KEMAMIDE W40 (N,N'-ethylenebisstearamide), KEMAMIDE P181 (oleyl palmitamide), KEMAMIDE W45 (N,N'-thylenebisstearamide), and KEMAMIDE W20 (N,N'-ethylenebisoleamide).

High molecular weight linear alcohols, such as those available from Petrolite and of the general formula

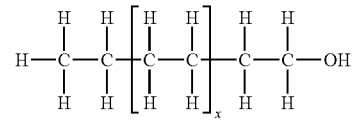

wherein x is an integer of from about 1 to about 50, such as from about 5 to about 35 or from about 11 to about 23, may also be used as the ink vehicle. These materials may have a melting point of from about 50° C. to about 150° C., such as from about 70° C. to about 120° C. or from about 75° C. to about 110° C., and a molecular weight (Mn) range of from about 100 to about 5,000, such as from about 200 to about 2,500 or from about 300 to about 1,500. Commercial examples include the UNILIN materials such as UNILIN 425 (Mn=460), UNILIN 550 (Mn=550), UNILIN 700 (Mn=700), and the like.

A still further example includes hydrocarbon-based waxes, such as the homopolymers of polyethylene available from Petrolite and of the general formula

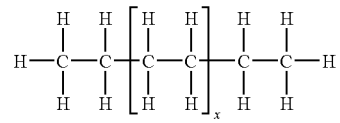

wherein x is an integer of from about 1 to about 200, such as from about 5 to about 150 or from about 12 to about 105. These materials may have a melting point of from about 60° C. to about 150° C., such as from about 70° C. to about 140° C. or from about 80° C. to about 130° C. and a molecular weight (Mn) of from about 100 to about 5,000, such as from about 200 to about 4,000 or from about 400 to about 3,000. Example waxes include the line of waxes, such as POLYWAX 500 (Mn=500), POLYWAX 655 (Mn=655), POLYWAX 850 (Mn=850), POLYWAX 1000 (Mn=1,000), and the like.

Another example includes modified maleic anhydride hydrocarbon adducts of polyolefins prepared by graft copolymerization, such as those available from Petrolite and of the general formulas

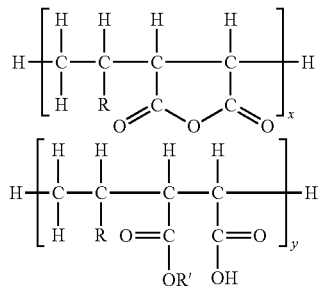

wherein R is an alkyl group with from about 1 to about 50, such as from about 5 to about 35 or from about 6 to about 28 carbon atoms, R' is an ethyl group, a propyl group, an isopropyl group, a butyl group, an isobutyl group, or an alkyl group with from about 5 to about 500, such as from about 10 to about 300 or from about 20 to about 200 carbon atoms, x is an integer of from about 9 to about 13, and y is an integer of from about 1 to about 50, such as from about 5 to about 25 or from about 9 to about 13, and having melting points of from about 50° C. to about 150° C., such as from about 60° C. to about 120° C. or from about 70° C. to about 100° C.; those available from Petrolite and of the general formula

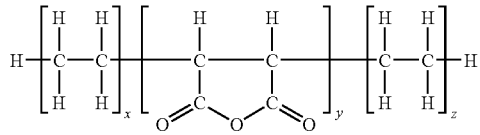

wherein R is an alkyl group with from about 1 to about 50, such as from about 5 to about 35 or from about 6 to about 28 carbon atoms, x is an integer of from about 1 to about 50, such as from about 5 to about 25 or from about 9 to about 13, y is 1 or 2, and z is an integer of from about 1 to about 50, such as from about 5 to about 25 or from about 9 to about 13; and those available from Petrolite and of the general formula

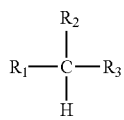

wherein $R_1$ and $R_3$ are hydrocarbon groups and $R_2$ is either of one of the general formulas

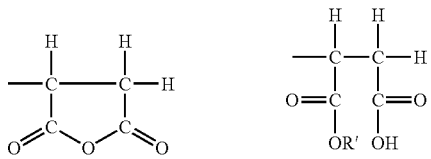

or a mixture thereof, wherein R' is an isopropyl group, which materials may have melting points of from about 70° C. to about 150° C., such as from about 80° C. to about 130° C. or from about 90° C. to about 125° C., with examples of modified maleic anhydride copolymers including CERAMER 67 (Mn=655, Mw/Mn=1.1), CERAMER 1608 (Mn=700, Mw/Mn=1.7), and the like.

Additional examples of suitable ink vehicles for the phase change inks include rosin esters; polyamides; dimer acid amides; fatty acid amides, including ARAMID C; epoxy resins, such as EPOTUF 37001, available from Riechold Chemical Company; fluid paraffin waxes; fluid microcrystalline waxes; Fischer-Tropsch waxes; polyvinyl alcohol resins; polyols; cellulose esters; cellulose ethers; polyvinyl pyridine resins; fatty acids; fatty acid esters; poly sulfonamides, including KETJENFLEX MH and KETJENFLEX MS80; benzoate esters, such as BENZOFLEX S552, available from Velsicol Chemical Company; phthalate plasticizers; citrate plasticizers; maleate plasticizers; sulfones, such as diphenyl sulfone, n-decyl sulfone, n-amyl sulfone, chlorophenyl methyl sulfone; polyvinyl pyrrolidinone copolymers; polyvinyl pyrrolidone/polyvinyl acetate copolymers; novolac resins, such as DUREZ 12 686, available from Occidental Chemical Company; and natural product waxes, such as beeswax, monton wax, candelilla wax, GILSONITE (American Gilsonite Company), and the like; mixtures of linear primary alcohols with linear long chain amides or fatty acid amides, such as those with from about 6 to about 24 carbon atoms, including PARICIN 9 (propylene glycol monohydroxystearate), PARICIN 13 (glycerol monohydroxystearate), PARICIN 15 (ethylene glycol monohydroxystearate), PARICIN 220 (N(2-hydroxyethyl)-12-hydroxystearamide), PARICIN 285 (N,N'-ethylene-bis-12-hydroxystearamide), FLEXRICIN 185 (N,N'-ethylene-bis-ricinoleamide), and the like. Further, linear long chain sulfones with from about 4 to about 16 carbon atoms, such as n-propyl sulfone, n-pentyl sulfone, n-hexyl sulfone, n-heptyl sulfone, n-octyl sulfone, n-nonyl sulfone, n-decyl sulfone, n-undecyl sulfone, n-dodecyl sulfone, n-tridecyl sulfone, n-tetradecyl sulfone, n-pentadecyl sulfone, n-hexadecyl sulfone, and the like, are suitable ink vehicle materials.

In addition, the ink vehicles described in U.S. Pat. No. 6,906,118, incorporated herein by reference, may also be used. Also suitable as ink vehicles are liquid crystalline materials as disclosed in, for example, U.S. Pat. No. 5,122,187, the disclosure of which is totally incorporated herein by reference.

The ink vehicle may comprise one or more of the aforementioned suitable materials.

The ink vehicle may comprise from about 25% to about 99.5% by weight of the ink, for example from about 30% to about 90% or from about 50% to about 85% by weight of the ink.

Suitable fluorescent materials include fluorescent dyes, fluorescent pigments and inorganic surface functionalized quantum dot materials. Examples of fluorescent dyes suitable for use herein include those belonging to the dye families known as rhodamines, fluoresciens, coumarins, napthalimides, benzoxanthenes, acridines, azos, mixtures thereof and the like. Suitable fluorescent dyes include, for example, Basic Yellow 40, Basic Red 1, Basic Violet 11, Basic Violet 10, Basic Violet 16, Acid Yellow 73, Acid Yellow 184, Acid Red 50, Acid Red 52, Solvent Yellow 44, Solvent Yellow 131, Solvent Yellow 85, Solvent Yellow 135, solvent Yellow 43, Solvent Yellow 160, Fluorescent Brightner 61, mixtures thereof and the like. Other suitable fluorescent dyes include oil and solvent based dyes like DFSB class, DFPD class, DFSB-K class available from Risk reactor of Huntington Beach, Calif. Suitable fluorescent pigments include, but are not limited to, those available from Day-Glo Color Corp. of Cleveland, Ohio, such as aurora pink T-11 and GT-11, neon red T-12, rocket red T-13 or GT-13, fire orange T-14 or GT-14N, blaze orange T-15 or GT-15N, arc yellow T-16, saturn yellow T-17N, corona magenta GT-21 and GT-17N, mixtures thereof and the like. Other suitable fluorescent pigments available from Risk Reactor are for example PFC class, like for example PFC-03 which switches from invisible to red when exposed to UV light, PF class like for example PF-09 which switches from invisible to violet when exposed to UV light. Other suppliers of fluorescent materials include Beaver Luminescers from Newton, Mass. and Cleveland Pigment &Color Co. form Akron, Ohio.

Quantum dot materials are fluorescent inorganic semiconductor nanoparticle materials. The light emission of quantum dots is due to quantum confinement of electrons and holes. An advantage of quantum dots is that they can be tuned so that they emit any desired wavelength (color) as a function of their size, by using one material only and the same synthetic process. For example in a range comprised from about 2 to about 10 nm, one can obtain a full range of colors from the visible range of the spectrum. In addition, quantum dots possess improved fatigue resistance when compared with organic dyes. Another advantage of quantum dots is their narrow emission bands, which increases the number of possible wavelength choices for designing customized colors. Due to their small size, typically less than about 30 nm, such as less than about 20 nm, they can be easily ink jetted. Quantum dots are available from a variety of companies, such as from Evident Technologies (Troy, N.Y.).

In embodiments, the quantum dot materials used herein are functionalized quantum dots. Surface functionalized quantum dots may have better compatibility with phase change ink materials set. Suitable functional groups present on the surface of the nanoparticle quantum dots for compatibility with phase change ink include long linear or branched alkyl groups, for example from about 1 carbon atom to about 150 carbon atoms in length, such as from about 2 carbon atoms to about 125 carbon atoms or from about 3 carbon atoms to about 100 carbon atoms. Other suitable compatibilizing groups include polyesters, polyethers, polyamides, polycarbonates and the like.

Suitable colored fluorescent materials, which are colored in ambient light and which fluoresce when exposed to the activating energy, include for example dyes such as DFWB-K41-80 that is red in ambient light and that fluoresces red-purple under UV light and DFSB-K401 that is red-purple in ambient light and that fluoresces red-purple under UV light, each of which is available from Risk Reactor. Other examples include DFSB-K400 that has a brown appearance in ambient light and that fluoresces orange under excitation with UV light, DFSB-K427 that is orange under ambient light and under exposure to UV light, and DFSB-K43 that is yellow in ambient light and under exposure to activating UV light.

Phase change inks of the ink set may also contain at least one non-fluorescent colorant. As used herein "colorant" includes pigment, dye, mixtures of dyes, mixtures of pigments, mixtures of dyes and pigments, and the like. The non-fluorescent colorant may be present in a colored ink in any desired amount, typically from about 0.5 to about 75 percent by weight of the ink vehicle or ink vehicle/propellant mixture, for example from about 1 to about 50 percent by weight of the ink vehicle.

Examples of suitable non-fluorescent colorants include pigments, dyes, mixtures of pigments and dyes, mixtures of pigments, mixtures of dyes, and the like. Any dye or pigment may be chosen, provided that it is capable of being dispersed or dissolved in the ink vehicle and is compatible with the other ink components. Examples of suitable pigments include, but are not limited to, Violet PALIOGEN Violet 5100 (BASF); PALIOGEN Violet 5890 (BASF); HELIOGEN Green L8730 (BASF); LITHOL Scarlet D3700 (BASF); Sunfast® Blue 15:4 (Sun Chemical 249-0592); Hostaperm Blue B2G-D (Clariant); Permanent Red P-F7RK; Hostaperm Violet BL (Clariant); LITHOL Scarlet 4440 (BASF); Bon Red C (Dominion Color Company); ORACET Pink RF (Ciba); PALIOGEN Red 3871 K (BASF); Sunfast® Blue 15:3 (Sun Chemical 249-1284); PALIOGEN Red 3340 (BASF); Sunfast® Carbazole Violet 23 (Sun Chemical 246-1670); LITHOL Fast Scarlet L4300 (BASF); Sunbrite Yellow 17 (Sun Chemical 275-0023); HELIOGEN Blue L6900, L7020 (BASF); Sunbrite Yellow 74 (Sun Chemical 272-0558); Spectra Pac® C Orange 16 (Sun Chemical 276-3016); HELIOGEN Blue K6902, K6910 (BASF); Sunfast® Magenta 122 (Sun Chemical 228-0013); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (Ciba); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASF); Suco Fast Yellow D1 355, D1 351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT), PALIOGEN Black L0084 (BASF); Pigment Black K801 (BASF); and carbon blacks such as REGAL 330™ (Cabot), Carbon Black 5250, Carbon Black 5750 (Columbia Chemical), mixtures thereof and the like. Examples of suitable dyes include Usharect Blue 86 (Direct Blue 86), available from Ushanti Color; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF Clariant; Carta Blue 2GL, available from Clariant; and the like.

In embodiments, solvent dyes are employed. An example of a solvent dye suitable for use herein may include spirit soluble dyes because of their compatibility with the ink vehicles disclosed herein. Examples of suitable spirit solvent dyes include Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF), Neozapon Black X51 [C.I. Solvent Black, C.I. 12195] (BASF), Sudan Blue 670 [C.I. 61554] (BASF), Sudan Yellow 146 [C.I. 12700] (BASF), Sudan Red 462 [C.I. 260501] (BASF), mixtures thereof and the like.

The phase change ink compositions may be prepared by combining all of the ingredients, heating the mixture to at least its melting point, for example from about 70° C. to about 120° C., and stirring the mixture, for example from about 5 seconds to about 10 minutes or more, to obtain a substantially homogeneous, uniform melt. When pigments are the selected colorants, the molten mixture may be subjected to grinding in an attritor or ball mill apparatus to effect dispersion of the pigment in the ink vehicle.

Printed images may be generated with the ink sets described herein by incorporating the ink sets, including at least one fluorescent ink, into an ink jet device, for example a thermal ink jet device, an acoustic ink jet device, a piezoelectric ink jet device and the like, and concurrently causing droplets of each of the molten inks of the ink set to be ejected in an imagewise pattern onto an image receiving substrate such as paper or transparency material. Each ink of the ink set is typically included in a reservoir connected by any suitable feeding device to the corresponding ejecting channels of the ink jet head. In the jetting procedure, the ink jet head may be heated, by any suitable method, to the jetting temperature of the inks. The phase change inks are thus altered from the solid state to a molten state at the jetting temperature.

The inks can also be employed in indirect printing ink jet applications, wherein when droplets of the melted ink are ejected in an imagewise pattern onto an image receiving substrate, the substrate is an intermediate transfer member and the ink in the imagewise pattern is subsequently transferred from the intermediate transfer member to a final recording substrate. The intermediate transfer member may be, for example, a drum.

In embodiments using an intermediate transfer member, the member may be heated to have a temperature on a surface thereof of from about 45° C. to about 80° C. For example, for low energy inks, the surface temperature may be from about 45° C. to about 60° C., and for high energy inks, the surface temperature may be from about 55° C. to about 80° C. The elevated surface temperature permits the ink to remain in a molten state while avoiding offset or ink splitting on the surface of the transfer member, thereby enabling good transfer of the image to the end image receiving substrate such as paper or transparency.

In embodiments, the ink jet system thus includes the aforementioned ink sets comprised of at least one phase change ink that contains a fluorescent material such that upon exposure to activating radiation, the at least one fluorescent ink fluoresces. In further embodiments, the ink jet system may also include the aforementioned ink sets comprised of differently colored phase change inks, and a separate phase change ink that includes the fluorescent material.

The system also includes an ink jet device including an ink jet head consisting of at least one channel for each one of the differently colored phase change inks in the ink set, and a supply path that supplies each of the differently colored phase change inks to the respective channels of the ink jet head, for example from reservoirs containing each of the differently colored phase change inks. As such, any known ink jet head may be used, and it is not necessary to add an additional channel dedicated solely to the use of the fluorescent ink in the ink jet head. However, such a channel dedicated to the fluorescent ink may be used when the fluorescent material is in a clear phase change ink base.

Images printed with the ink sets disclosed herein that include at least one colored phase change ink having a fluorescent material therein, have at least one color of the image that in normal ambient light, for example incandescent light, has a first color state corresponding to a first absorption spectrum, while fluorescing to exhibit a second color state corresponding to a second absorption spectrum following exposure of the ink to activating radiation, for example UV light. In further embodiments, images printed with the ink sets disclosed herein that include at least one substantially colorless fluorescent ink therein such that in normal ambient light, for example incandescent light, have a first substantially clear color state, while fluorescing to exhibit a second color state corresponding to an absorption spectrum following exposure of the ink to activating radiation, for example UV light.

Examples of methods for inducing the fluorescence include irradiation with radiation of a suitable wavelength, typically from about 200 to about 400 nanometers. To stop the fluorescence, exposure to the radiation may be discontinued. Once the exposure the radiation is discontinued, the fluorescence ceases and the image returns to its original state.

Embodiments described above will now be further illustrated by way of the following examples.

EXAMPLE 1

Blue Emitting Fluorescent Dye 99 g of polyethylene wax base was added to a beaker and transferred to an oven at about 140° C. for approximately 3 hours. Upon melting, the beaker with ink base was transferred to a Griffin heating mantle and was mixed using an overhead stirrer at about 175 RPM for approximately 30 minutes. 1.0 g of a fluorescent compound DFSB-CO® (blue emitting fluorescent dye) from Risk Reactor was added slowly to the stirring ink base over the course of 10 minutes. The solution was stirred for an additional two hours whereupon it was filtered through a 0.22 μm nylon filter in a 70 mm Mott filtration assembly at approximately 135° C. The ink filtrate was poured into an aluminum dish and allowed to cool and solidify.

EXAMPLE 2

Red Emitting Fluorescent Dye 99 g of a polyethylene wax base was mixed with 1.0 g of fluorescent dye DFKY-C7® (red emitting fluorescent dye) also from Risk Reactor. The composition was prepared as described in Example 1 herein.

EXAMPLE 3

Yellow Ink with Red Emitting Fluorescent Dye 196 g of non-fluorescent yellow phase change ink used in a phase change ink printer was mixed with 4 g of DFSB C7®. The composition was prepared as described in Example 1 herein.

Printing Results

A blank sheet of white paper was printed with the ink fabricated in Example 1 to form a text message with the ink, by using a modified ink jet printer. The same print was made using the ink from Example 2.

After printing, the printed information was substantially invisible except for some differential gloss due to the application of the non-fluorescent ink.

When exposed to UV light (about 365 nm), the text on the printed page became easily visible, as text appearing blue in Example 1 and as text appearing red in Example 2. After removal of the UV light, the image again became substantially invisible. This cycle may be repeated many times.

A sheet of paper previously printed with a full color picture from a phase change ink printer was overprinted with clear inks from Examples 1 and 2. Under normal viewing conditions, the message printed with the inks from Examples 1 and 2 was practically undetectable because of the reduced differential gloss between the printed image and the printed text.

A picture containing yellow colored areas was printed with the ink of Example 3 on a blank sheet of white paper. Under normal viewing conditions, the picture appeared to be a regular full color print. When exposed to UV light, all areas of the picture having yellow component became red. The color again became yellow after removal of the UV light. This cycle may be repeated many times.

Only the authentic, original document would have the ability of displaying the substantially invisible/visible behavior. A copy would show only the image in the visible state, and would not show any fluorescence or invisible/visible behavior. This allows one to embed authenticating capability into the document, such as a message, image, etc., including computer readable information. In addition, creative image formulations are possible by intentionally taking advantage of changes due to the fluorescent material.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. An ink set comprised of at least one fluorescent phase change ink comprising at least one fluorescent material, wherein upon exposure to activating energy, the fluorescent material fluoresces to cause a visible change in the appearance of the ink and wherein the at least one fluorescent phase change ink is substantially colorless when not exposed to activating energy.

2. The ink set according to claim 1, wherein the ink set further comprises at least one fluorescent phase change ink that comprises a non-fluorescent colorant, such that when the at least one phase change ink is not exposed to activating energy, it exhibits the color of the non-fluorescent colorant.

3. The ink set according to claim 1, wherein the ink set further comprises at least one additional phase change ink that does not include a fluorescent material.

4. The ink set according to claim 2, wherein the non-fluorescent colorant is selected from the group consisting of pigments, dyes, mixtures of pigments and dyes, mixtures of pigments and mixtures of dyes.

5. The ink set according to claim 2, wherein the non-fluorescent colorant is magenta, yellow, cyan or black.

6. The ink set according to claim 1, wherein the at least one fluorescent material is selected from the group consisting of coumarins, napthalimide, benzoxanthenes acridines, azos, quantum dot materials and mixtures thereof.

7. The ink set according to claim 6, wherein a total amount of fluorescent materials comprises from about 0.1% to about 75% by weight of the phase change ink containing the fluorescent material or the fluorescent phase change ink.

8. The ink set according to claim 1, wherein each ink of the ink set includes an ink vehicle selected from the group consisting of ethylene/propylene copolymers, urethane derivates of oxidized synthetic or petroleum waxes, n-paraffinic hydrocarbons, branched paraffinic hydrocarbons, naphthenic hydrocarbons, highly branched hydrocarbons, ethoxylated alcohols, linear alcohols, hydrocarbon-based waxes, modified maleic anhydride hydrocarbon adducts of polyolefins prepared by graft copolymerization, mixtures of monoamides and tretraamides, and mixtures thereof.

9. The ink set according to claim 8, wherein the ink vehicle is a solid at a temperature below about 40° C. and has a viscosity of from about 1 to about 20 centipoise at a jetting temperature of from about 60° C. to about 150° C.

10. The ink set according to claim 8, wherein the ink vehicle is a solid at a temperature below about 40° C. and has a viscosity of from about 5 to about 15 centipoise at a jetting temperature of from about 110° C. to about 120° C.

11. The ink set according to claim 1, wherein the ink set is comprised of at least four differently colored phase change inks and including at least a cyan phase change ink, a magenta phase change ink, a yellow phase change ink, and a black phase change ink, each of which is a non-fluorescent phase change ink, and the at least one fluorescent phase change ink.

12. An ink jet system, comprising:
    an ink set comprised of at least one fluorescent phase change ink comprising at least one fluorescent material, wherein upon exposure to activating energy, the fluorescent material fluoresces to cause a visible change in the appearance of the ink, and wherein the at least one fluorescent phase change ink is substantially colorless when not exposed to activating energy, and
    an ink jet device including an ink jet head consisting of at least one channel for each of the phase change inks in the ink set, and a supply path that supplies each of the phase change inks to the respective channels of the ink jet head from reservoirs containing each of the phase change inks.

13. The ink jet system according to claim 12, wherein the ink set further comprises at least one fluorescent phase change ink that comprises a non-fluorescent colorant, such that when the at least one phase change ink is not exposed to activating energy, it exhibits the color of the non-fluorescent colorant.

14. The ink jet system according to claim 12, wherein the ink set further comprises at least one additional phase change ink that does not include a fluorescent material.

15. The ink jet system according to claim 12, wherein the fluorescent material is selected from the group consisting of coumarins, napthalimide, benzoxanthenes acridines, azos, quantum dot materials and mixtures thereof.

16. A process of making an image having fluorescent ability, comprising:
    jetting an ink from an ink set onto a recording media to form an image, and
    curing the image by exposing the image to radiation,
    wherein the ink set is comprised of at least one fluorescent phase change ink comprising at least one fluorescent material, wherein upon exposure to activating energy, the fluorescent material fluoresces to cause a visible change in the appearance of the ink, and wherein the at least one fluorescent phase change ink is substantially colorless when not exposed to activating energy.

17. The process according to claim 16, wherein the wavelength of the activating energy is from about 200 nm to about 1,100 nm.

18. The process according to claim 16, wherein the ink set further comprises at least one fluorescent phase change ink that comprises a non-fluorescent colorant, such that when the at least one phase change ink is not exposed to activating energy, it exhibits the color of the non-fluorescent colorant.

19. The process according to claim 16, wherein the ink set further comprises at least one additional phase change ink that does not include a fluorescent material.

20. The process according to claim 19, wherein the at least one fluorescent phase change ink overcoats the at least one additional phase change ink that does not include a fluorescent material.

21. The process according to claim 16, wherein the fluorescent material is selected from the group consisting of coumarins, napthalimide, benzoxanthenes acridines, azos, quantum dot materials and mixtures thereof.

22. The process according to claim 16, further comprising authenticating the image by exposing the image to the activating radiation to initiate fluorescence of the at least one phase change ink.

\* \* \* \* \*